United States Patent [19]

Maeda

[11] Patent Number: 5,305,299
[45] Date of Patent: Apr. 19, 1994

[54] SUPPORT MECHANISM FOR OPTICAL BLOCK IN OPTICAL DISC DRIVE APPARATUS

[75] Inventor: Tamotsu Maeda, Kanagawa, Japan

[73] Assignee: Sony Corporation, Tokyo, Japan

[21] Appl. No.: 900,860

[22] Filed: Jun. 18, 1992

[30] Foreign Application Priority Data

Jun. 21, 1991 [JP] Japan .................. 3-177340

[51] Int. Cl.⁵ .................. G11B 17/30; G11B 23/00
[52] U.S. Cl. .................. 369/215; 369/263
[58] Field of Search .................. 369/215, 219, 263

[56] References Cited

U.S. PATENT DOCUMENTS

| | | | |
|---|---|---|---|
| 4,823,336 | 4/1989 | Inada et al. | 369/215 |
| 4,914,647 | 4/1990 | Ono et al. | 369/77.2 |
| 5,025,436 | 6/1991 | Crain et al. | 369/77.2 |
| 5,027,334 | 6/1991 | Yamanaka et al. | 369/13 |
| 5,070,494 | 12/1991 | Emoto et al. | 369/12 |
| 5,091,898 | 2/1992 | Bessho et al. | 369/77.2 |
| 5,115,423 | 5/1992 | Maeda et al. | 369/112 |
| 5,122,998 | 6/1992 | Mizuno et al. | 369/13 |
| 5,124,971 | 6/1992 | Nomura et al. | 369/215 |
| 5,132,944 | 7/1992 | Berg | 369/13 |
| 5,172,367 | 12/1992 | Hinotani | 369/215 |
| 5,187,702 | 2/1993 | Takahashi | 369/215 |

FOREIGN PATENT DOCUMENTS

| | | | |
|---|---|---|---|
| 0074865 | 6/1981 | Japan | 369/219 |
| 0115659 | 7/1983 | Japan | 369/219 |
| 61-267972 | 11/1986 | Japan | 369/244 |
| 61-269267 | 11/1986 | Japan | 369/244 |
| 0280037 | 12/1986 | Japan | 369/215 |
| 63-69076 | 3/1988 | Japan | 369/244 |
| 1-86375 | 3/1989 | Japan | 369/244 |
| 1-89068 | 4/1989 | Japan . | |
| 4-90172 | 3/1992 | Japan | 369/244 |
| 4-139654 | 5/1992 | Japan . | |

*Primary Examiner*—Edward K. Look
*Assistant Examiner*—Hoang Nguyen
*Attorney, Agent, or Firm*—Philip M. Shaw, Jr.

[57] ABSTRACT

A support mechanism for an optical block provided with an optical head, wherein provision is made of a reference shaft and a support shaft attached in parallel to the reference shaft, the optical block being supported between the reference shaft and the support shaft in a movable manner by positioning rotational members which are provided at one side of the optical block and which are for positioning and guiding at two locations along the axial direction of the reference shaft and by supporting rotational members which are provided at the other side of the optical block and which are for supporting and guiding the optical block at two locations of the support shaft corresponding to the two locations along the axial direction of the reference shaft. The supporting rotational members for supporting the optical block with respect to the reference shaft are elastically supported so as to be able to approach and move away from the optical block, so even when there is a fluctuation in the distance between the reference shaft and the support shaft supporting the optical block, the occurrence of rotational motion about the direction along the direction of movement of the optical block can be suppressed.

9 Claims, 7 Drawing Sheets

SUPPORT MECHANISM FOR OPTICAL BLOCK IN OPTICAL DISC DRIVE APPARATUS

BACKGROUND OF THE INVENTION

1. Field of the Invention

The present invention relates to a support mechanism for an optical block having an optical head in an optical disc drive apparatus which performs writing and/or reading of signals carrying information with respect to an optical disc, an optomagnetic disc, or other disc-like recording media.

2. Description of the Related Art

In the past, there have been optical discs, opto-magnetic discs, and other disc-like recording media. Proposal has been made of an optical head which performs the writing and/or reading of signals carrying information by irradiation of a beam of light on these disc-like recording media.

A disc apparatus comprised so as to enable recording and/or reproduction of information signals on and/or from the above-mentioned disc-like recording media using such an optical head is provided with a support mechanism for an optical block having the optical head so as to enable the beam of light emitted from the optical head to be irradiated perpendicularly with respect to the signal recording surface of the disc-like recording medium and also to enable the optical head to be moved and operated across the inner and outer circumferences of the disc-like recording medium.

For such a support mechanism, in the past, as shown in FIG. 1 and FIG. 2, proposal has been made of a mechanism wherein a plurality of rollers 53, 54, 55, 56, 57, 58, and 59 are rotatably attached to an optical block 52 having an optical head 51 where an object lens 51a etc. are held, these rotatable rollers 53, 54, 55, 56, 57, 58, and 59 are made to abut against a reference shaft 60 and a support shaft 61 arranged in parallel set apart a predetermined distance from each other, and thus the optical block 52 is supported between the above-mentioned shafts 60 and 61 in a manner enabling movement in the axial direction of the reference shaft 60.

In the above-mentioned support mechanism, among the above-mentioned plurality of rollers 53, 54, 55, 56, 57, 58, and 59, the two pairs of rollers 53, 54 and 55, 56 abutting against and so as to grip the reference shaft 60 are attached rotatably to one side of the optical block 52. Further, the remaining rollers 57, 58, and 59 abutting against the support shaft 61 are rotatably attached to the other side of the optical block 52. The rotating roller 57 is provided at the side of the optical block 52 where the optical head 51 is. At the opposite side of the above-mentioned optical block 52 where the optical head 51 is not present, at the bottom in FIG. 1, a pair of rollers 58 and 59 which abut against so as to grip with the rotational roller 57 the support shaft 61 are attached rotatably to L-sectional shape plate springs 62 and 63 attached to the optical block 52. In the plate springs 62 and 63, the base portions 62a and 63a are affixed by setscrews etc. to the optical block 52, while the tip portions 62b and 63b are made to elastically deform in the direction shown by the arrow a in FIG. 1, so a gripping pressure is caused on the support shaft 61.

Therefore, in the support mechanism, the rollers 58 and 59 attached to the plate springs 62 and 63 are pressed to the support shaft 61 side by the elastic force of the plate springs 62 and 63. By the counteraction of this, the optical block 52 is elastically biased to the reference shaft 60 side, whereby the optical block 52 is positioned based on the reference shaft 60.

Further, as another conventional support mechanism, as shown in FIG. 3 and FIG. 4, there has been proposed a mechanism wherein a plurality of rollers 76, 77, 78, 79, 80, and 81 are attached rotatably to an optical block 52 having an optical head 51 where an object lens 51a etc. are held, these rotating rollers 76, 77, 78, 79, 80, and 81 are made to abut against the reference shaft 60 and support shaft 61 which are disposed in parallel with each other set apart by a predetermined distance, and the optical block 52 is supported between the two shafts 60 and 61 in a manner movable in the axial direction of the reference shaft 60.

That is, in the above support mechanism, two pairs of positioning rollers 76, 77 and 78, 79 are attached in the front and rear of the optical block 52 in the direction of travel thereof shown by the arrow T in FIG. 4. These pairs of positioning rollers 76, 77 and 78, 79 are provided rotatably at one side of the optical block 52.

On the other hand, at the other side of the optical block 52 opposite to the side of attachment of the positioning rollers 76, 77, 78, and 79, there is attached a roller support member 82 for pressing the pair of pressure rollers 80 and 81 to the support shaft 61.

The roller support member 82, as shown in FIG. 3, is comprised of a roller holder 83 for attaching the pair of pressure rollers 80 and 81 and a holder support member 84 for supporting the roller holder 83.

The holder support member 84 is for pressing the pair of pressure rollers 80 and 81 attached to the roller holder 83 to the support shaft 61. For example, it is formed from a spring material comprised of a metal sheet etc. and so as to have a U-sectional shape. It has a pair of convex portions 86 and 87 and has a flat surface elastic displacement portion 88 which projects slightly toward the roller holder 83 side. The elastic displacement portion 88 is such that when the holder support member 84 is attached to the optical block 52, the pair of convex portions 86 and 87 abut against the side surface 52a of the optical block 52 in linear contact, so elastically displaces in a direction (the arrow X direction in FIG. 3) substantially perpendicular to the axial direction of the support shaft 61 using the convex portions 86 and 87 as support points. Therefore, the pair of pressure rollers 80 and 81 attached to the roller holder 83 are disposed so as to abut so as to grip the support shaft 61 by the peripheral surfaces of the pressure rollers 80 and 81. Further, at this time, the elastic displacement portion 88 provided at the holder support member 84 is elastically deformed to the side close to the optical block 52, so the elastic displacement portion 88 presses the pressure rollers 80 and 81 against the support shaft 61 in a direction substantially perpendicular to the axial direction of the support shaft 61 shown by the arrow X direction in FIG. 3, so due to the counteraction, the optical block 52 is elastically biased to the reference shaft 60 side and therefore the optical block 52 is positioned based on the reference shaft 61.

However, in the support mechanism as shown in FIG. 1 and FIG. 2, the reference shaft 60 and the support shaft 61, which are disposed in parallel with each other set apart by a predetermined distance, ideally have a constant distance between the two shafts, that is, shaft pitch, across the entire path of travel, but there is some fluctuation of the shaft pitch due to the mechanical precision at the time of arranging the shafts 60 and 61, the precision of the shafts themselves, the pressure applied by the plate springs 62 and 63, etc.

Therefore, among the rollers 57, 58, and 59 abutting so as to grip the support shaft 61, only the rollers 58 and 59 have been made to elastically biased to the support shaft 61 by the plate springs 62 and 63, so as shown in FIG. 5, the optical block 52 ends up slanted from the state shown by the broken line to the state shown by the solid line by the amount by which the distance (P) of the shafts becomes smaller than the predetermined value. That is, rotational motion (below called "rolling") about the direction along the direction of travel of the optical block 52 occurs and the optical block 52 slants. Therefore, it becomes impossible to irradiate an accurate light beam to the signal recording surface of the disc-shaped recording medium from the optical head 51 provided at the optical block 52.

Further, in the conventional support mechanism shown in FIG. 3 and FIG. 4, even if the shaft pitch between the reference shaft 60 and the support shaft 61 changes, the roller holder 83 of the pressure rollers 80 and 81 moves only in the arrow X direction in FIG. 3, so rolling of the optical block 52 such as shown by R in FIG. 3 can be avoided. However, even in this support mechanism, the optical block 52 is constructed to only grip one location of the support shaft 61 in the axial direction by the pressure rollers 80 and 91 at the other side, so when the optical block 52 travels in the front-rear direction of the two shafts 60 and 61 shown by the arrow T in FIG. 4, the phenomenon is discovered of vibration upward and downward in the direction shown by the arrow Y in FIG. 4 around near the location of gripping by the pressure rollers 80 and 81. It was found that there was a problem of the optical head 51 attached to the optical block 52 being affected by this, whereby the optical axis of the object lens 51a fluctuated. This is believed to be caused from the mechanical resonance system of the drive and support structure as a whole, comprised of the support of the optical block 52 with respect to the reference shaft 60 and the support shaft 61 and the mechanism of movement of the optical block 52, the linear motor 87 etc.

SUMMARY OF THE INVENTION

The object of the present invention is to provide an ideal support mechanism for an optical block which prevents upward and downward vibration in a direction perpendicular to the direction of travel of the optical block.

Another object of the present invention is to provide a support mechanism for an optical block in an optical disc drive apparatus which prevents rolling of the optical block caused due to fluctuations in the distance between the reference shaft and the support shaft supporting the optical block and realizes stable feed of the optical block.

Still another object of the present invention is to provide a support mechanism for an optical block in an optical disc drive apparatus which reduces the number of parts and enables realization of a more streamlined mechanism.

A support mechanism of an optical block in an optical disc drive apparatus provided with a reference shaft, a support shaft positioned substantially parallel to the reference shaft, and an optical block which has an optical head and which is supported between the reference shaft and the support shaft by the support mechanism so that the optical block moves along an axial direction of the reference shaft substantially in parallel with the reference shaft. According to the invention, the support mechanism comprises at least two positioning rotational members provided at a positioning side of the optical block for positioning and guiding the optical block at two positioning locations along the axial direction of the reference shaft, at least two supporting rotational members provided at a supporting side of the optical block for supporting and guiding the optical block at two supporting locations along the support shaft, and a roller support member including an attachment portion attached to the optical block and wings which elastically support the supporting rotational members so that the supporting rotational members approach and move away from the optical block and so that when any one of the supporting rotational members is moved toward the optical block, the wing supporting that supporting rotational member elastically presses that supporting rotational member away from the optical block.

Note that further objects and advantages of the present invention will become more apparent from the specific embodiments explained below with reference to the drawings.

DESCRIPTION OF THE PREFERRED EMBODIMENTS

Below, an explanation will be made of specific embodiments of the invention of this application with reference to FIG. 6, FIG. 7, and FIG. 8.

Figure 1:
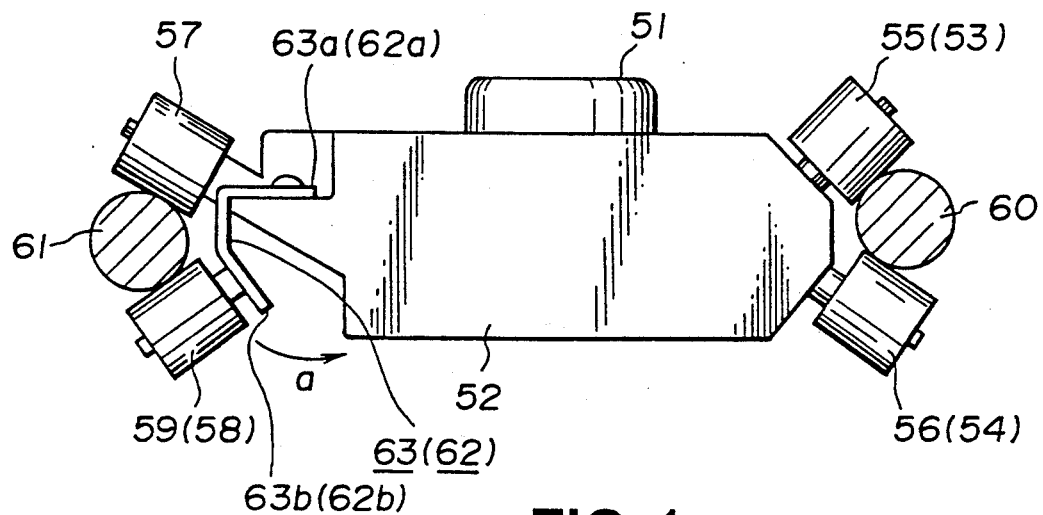
FIG. 1 is a front view showing the support mechanism of a conventional optical block.
Figure 2:
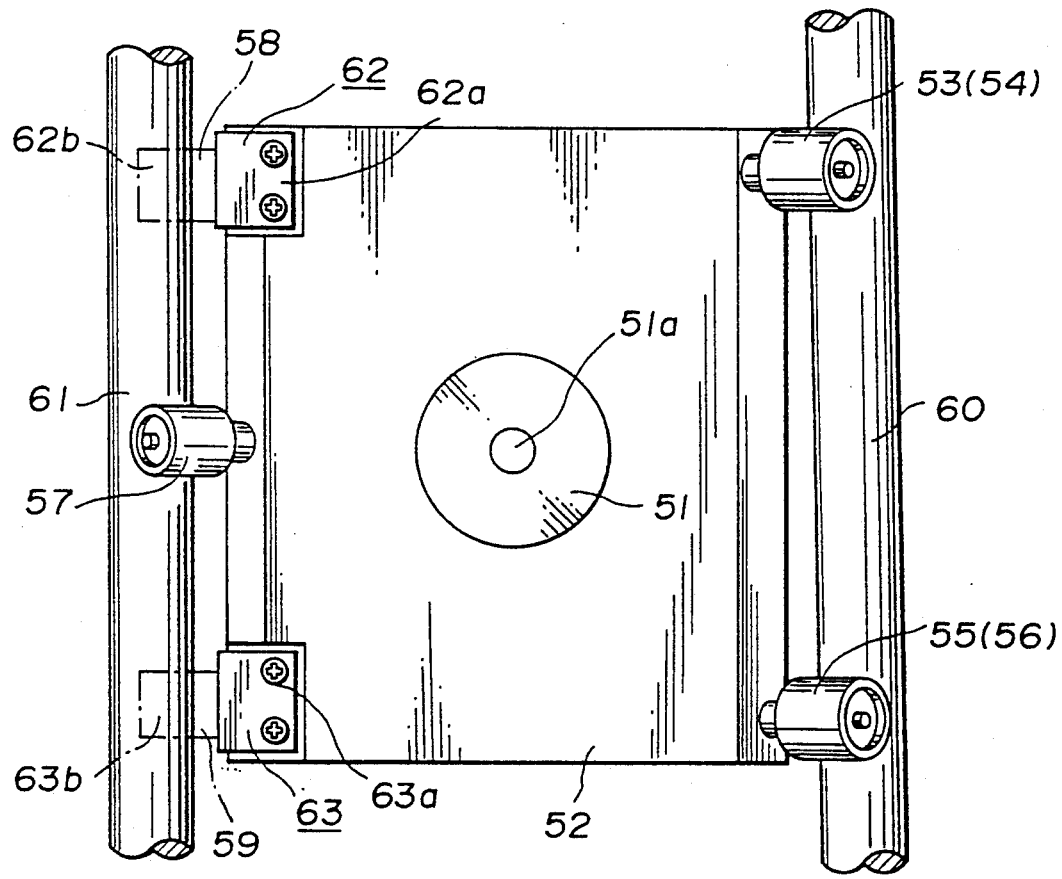
FIG. 2 is a plane view of the support mechanism of the optical block shown in FIG. 1.
Figure 3:
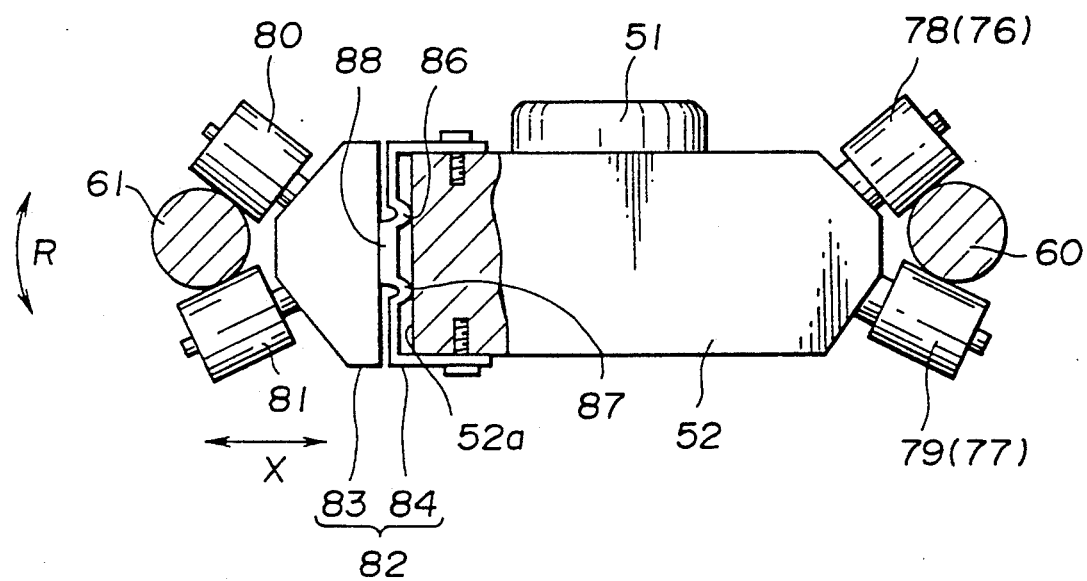
FIG. 3 is a front view of another example of a conventional support mechanism of an optical block.
Figure 4:
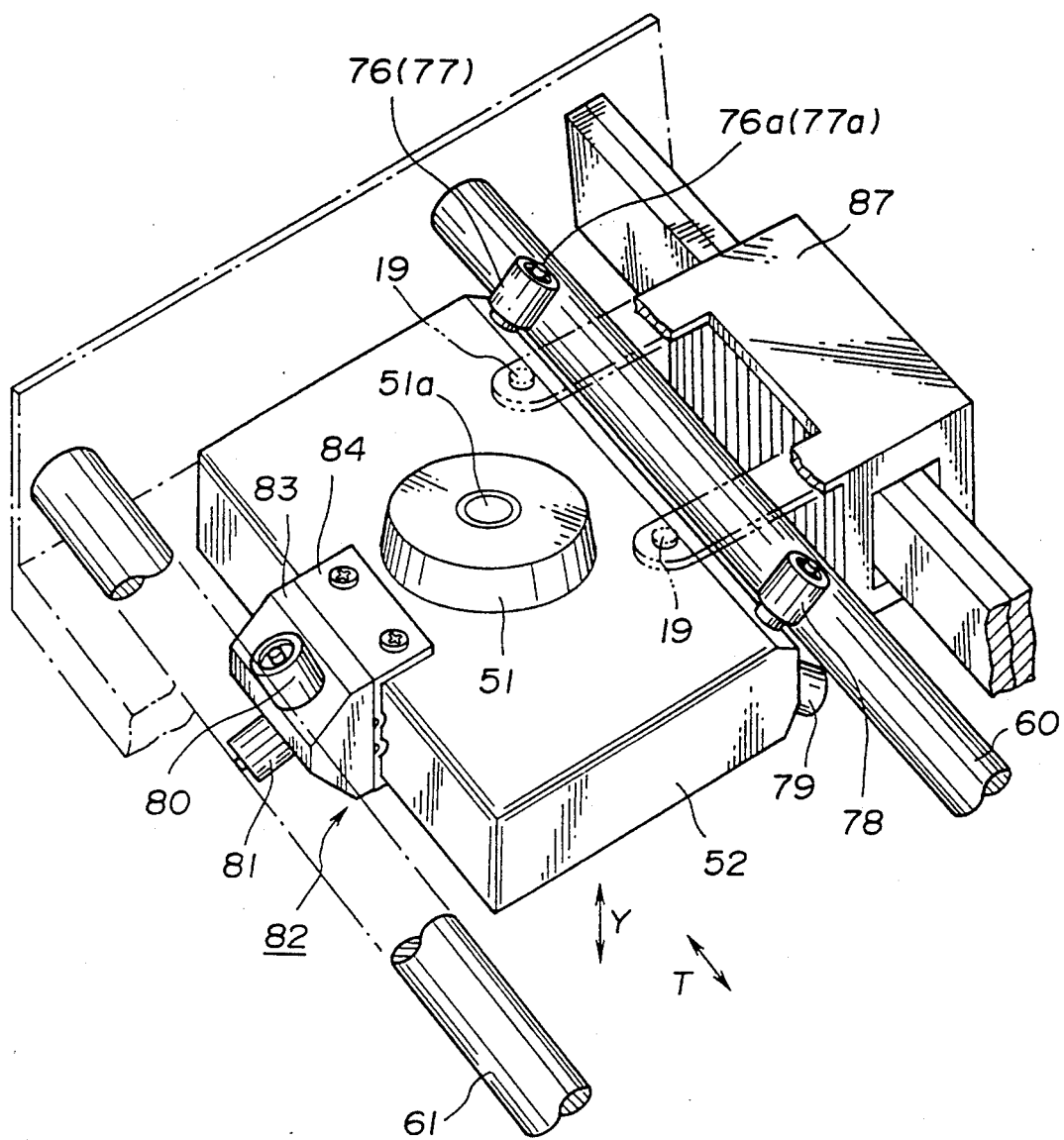
FIG. 4 is a perspective view showing the support mechanism for an optical block shown in FIG. 3 in a partially disassembled state.
Figure 5:
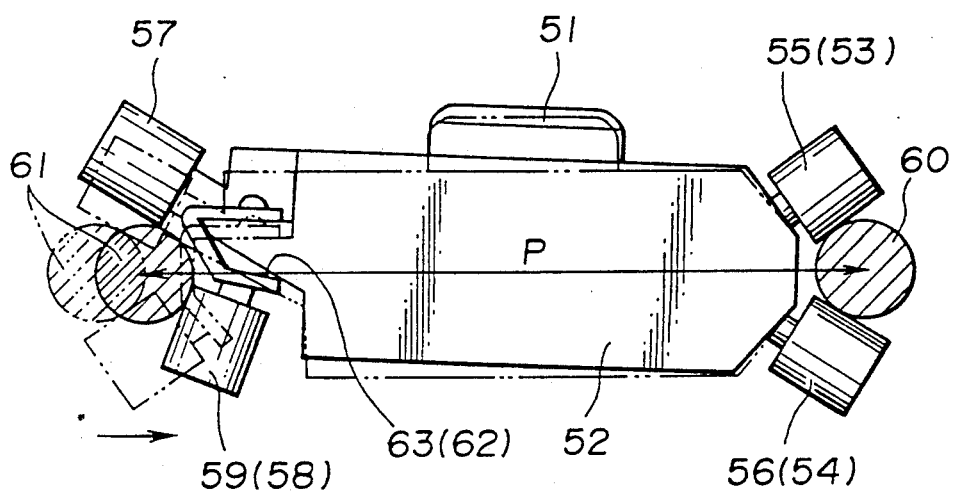
FIG. 5 is a front view for explaining the problems of a conventional support mechanism of an optical block.
Figure 6:
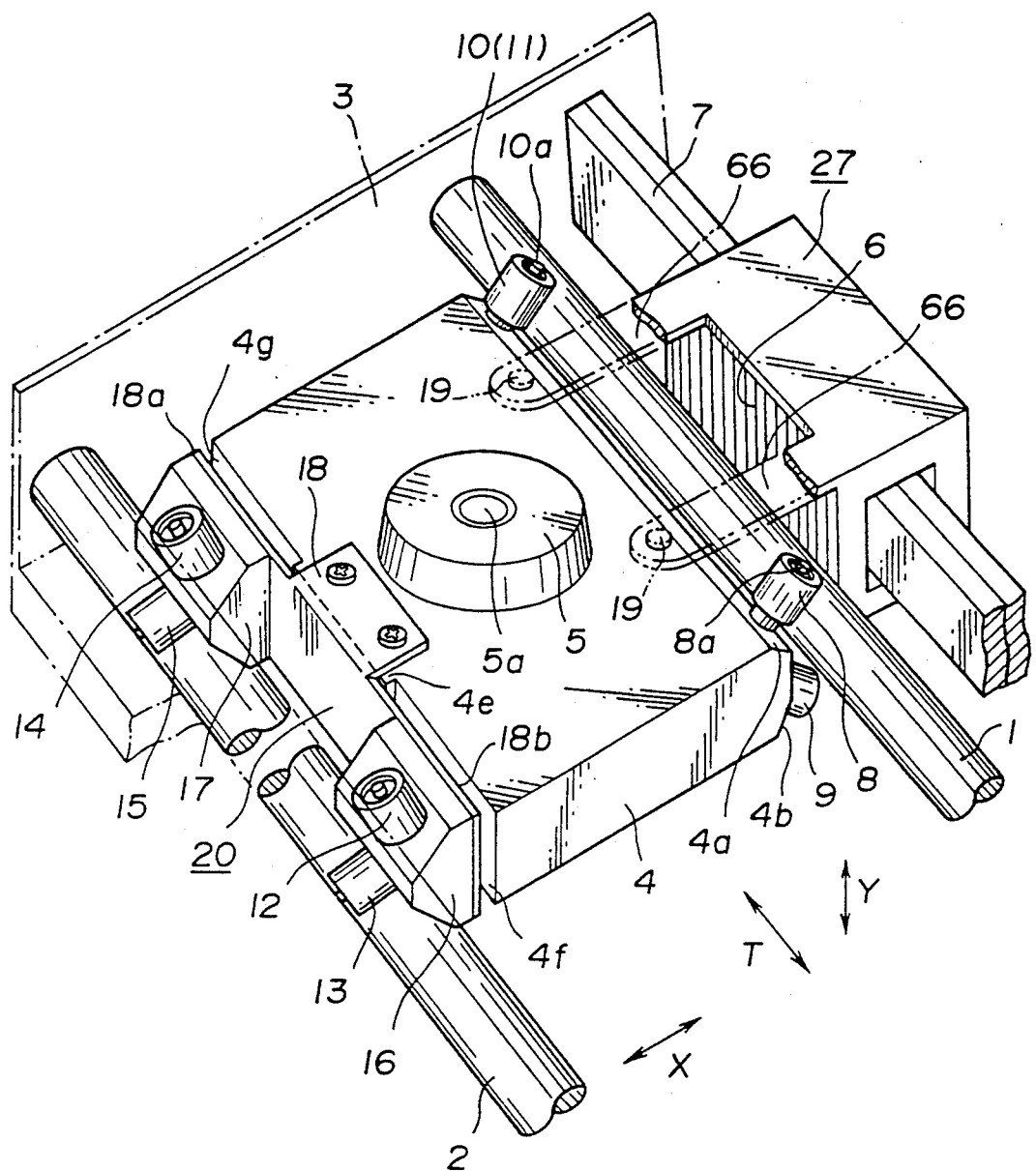
FIG. 6 is a perspective view showing the support mechanism of an optical block according to the present invention in a partially disassembled state.

In the support mechanism for an optical block according to the present invention, provision is made, as shown in FIG. 6, of a reference shaft 1 and a support shaft 2 disposed in parallel with the reference shaft 1 at a fixed distance from the same. The reference shaft 1 is supported by the chassis 3 constituting the optical disc apparatus so that it lies in a direction across the inner and outer circumferences of the disc-like recording medium, not shown, attached to the optical disc apparatus.

The support shaft 2 is supported by the chassis 3 so that it becomes parallel to the reference shaft 1 at a distance sufficient for supporting the optical block 4 with the reference shaft 1.

In the support mechanism, the optical block 4 is supported between the reference shaft 1 and the support shaft 2. The optical block 4 has disposed an optical head 5 having for example a prism or object lens 5a. A beam of light emitted from a semiconductor laser or other light source equipped in the optical head 5 is condensed on the signal recording surface of the disc-like recording medium by the object lens 5a.

At one side of the optical block 4 in the direction along the reference shaft 1, two pairs of positioning rollers 8, 9 and 10, 11 are attached at the front and rear in the direction of travel of the optical block 4 shown by the arrow mark T in FIG. 6. The pairs of positioning rollers 8, 9 and 10, 11 are attached, in a rotatable manner by bearings etc., for example, to the shafts 8a and 10a implanted in the slanted surfaces 4a and 4b provided at one side of the optical block 4. The shafts 8a and 10a are implanted slanted from each other by a predetermined angle with respect to the direction of travel of the optical block 4, that is, in a V-shape. Therefore, the pairs of positioning rollers 8, 9 and 10, 11 abut so as to grip the reference shaft 1 at the peripheral surfaces of the positioning rollers 8, 9 and 10, 11.

Note that the rotation shafts 8a and 10a of the positioning rollers 8, 9 and 10, 11 are attached so as to form angles of about 45° with respect to the plane including the axis of the reference shaft 1 and the axis of the support shaft 2 in this embodiment. On the other hand, at the other side of the optical block 4 opposite to the side where the positioning rollers 8, 9 and 10, 11 are attached, two pairs of pressure rollers 12, 13 and 14, 15 are disposed, which pressure rollers 12, 13 and 14, 15 are attached to the roller support member 20 so as to be pressed against the support shaft 2.

The above-mentioned roller support member 20 is comprised of roller holders 16 and 17 for attaching the pairs of pressure rollers 12, 13 and 14, 15 and a holder support member 18 for supporting the roller holders 16 and 17.

Note that the shafts 12a, 13a and 14a, 15a of the pressure rollers 12, 13 and 14, 15 are attached to the roller holders 16, 17 so as to form angles of about 45° with respect to the plane including the axial center of the reference shaft 1 and the axial center of the support shaft 2.

Figure 7:
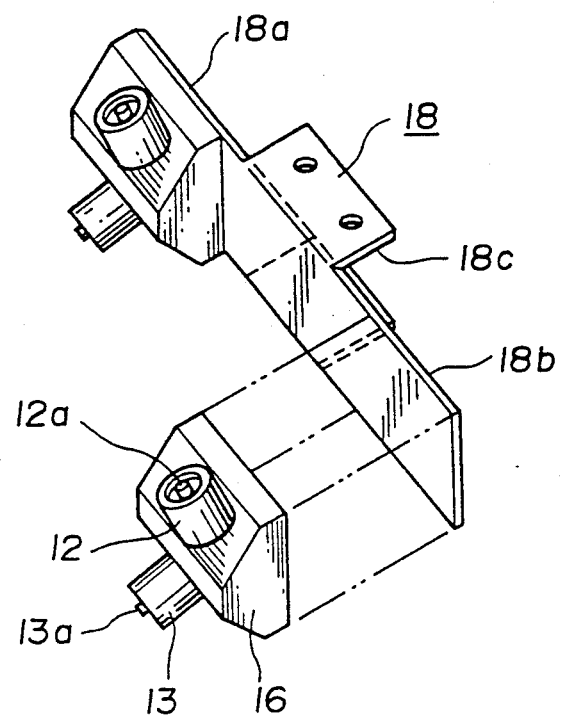
FIG. 7 is a perspective view showing the state of attachment of the pressure rollers to the roller support member.

The holder support member 18, as shown in FIG. 7, is for pressing to the support shaft 2 the pairs of pressure rollers 12, 13 and 14, 15 attached to the roller holders 16 and 17. For example, an attachment portion 18c is provided on the optical block 4 at the center thereof by a spring material comprised of a metal sheet etc. and the two wings thereof are provided with elastic displacement portions 18a and 18b to attach the roller holders 16 and 17.

Figure 8:
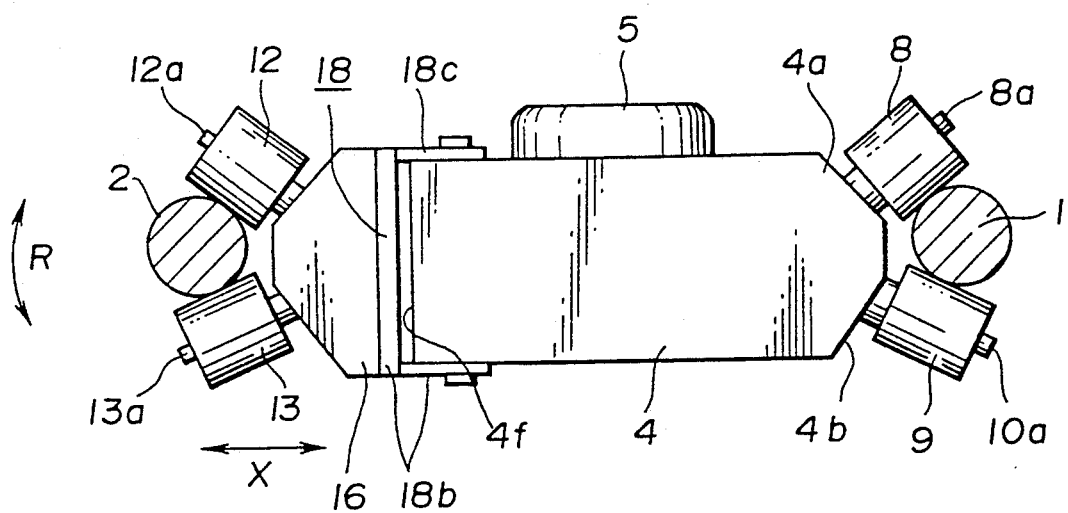
FIG. 8 is a side view showing the support mechanism of an optical block according to the present invention.

The holder support member 18 constituted in this way is made so that when attached to the optical block 4, as shown in FIG. 8, the elastic displacement portions 18a and 18b at the two wings are able to be displaced close to or away from the side faces 4f and 4g of the optical block 4. That is, cutaway step portions are formed at the side surfaces 4f and 4g of the optical block 4 and spaces are constituted allowing elastic displacement of the elastic displacement portions 18a and 18b between the side surfaces 4f and 4g and the elastic displacement portions 18a and 18b.

The pairs of pressure rollers 12, 13 and 14, 15 attached to the above-mentioned roller holders 16 and 17 are disposed abuttingly so as to grip the support shaft 2 by the peripheral surfaces of the pressure rollers 12, 13 and 14, 15. Further, at this time, the elastic displacement portions 18a and 18b provided at the holder support member 18 press the pressure rollers 12, 13 and 14, 15 to the support shaft 2 in a direction substantially perpendicular to the axial direction of the support shaft 2 shown by the arrow X direction in FIG. 6, so due to the counteraction thereof, the optical block 4 is elastically biased to the reference shaft 1 side, whereby the optical block 4 is positioned based on the reference shaft 1.

The thus supported optical block 4 is made able to be moved in only the axial direction of the reference shaft 1, that is, in the direction across the inner and outer circumferences of the disc-like recording medium, as shown by the arrow T in FIG. 6.

The above-mentioned optical block 4, as shown in FIG. 6, has attached to it a pair of connecting arms 66, 66 of a linear motor 27 by setscrews 19. The linear motor 27 is comprised of a bar-shaped yoke 7 through which the magnetic flux caused by a magnet, not shown, passes, a coil 6 disposed so as to surround the yoke 7, and the above-mentioned pair of connecting arms 66, 66. The yoke 7 is supported by the chassis 3 so as to be substantially parallel to the reference shaft 1. The linear motor 17 is made to be driven and displaced in the longitudinal direction of the yoke 7 by the supply of a predetermined drive current. That is, when a drive current of a predetermined direction is supplied to the above-mentioned coil 6, the optical block 4 is moved and operated along the reference shaft 1.

For example, at this time, when reaching a location where the distance between the reference shaft 1 and the support shaft 2 becomes larger than even the preset reference distance at the middle of the path of travel, the elastic displacement portion provided at the roller support member 18 displaces in the direction substantially perpendicular to the axial direction of the support shaft 2 by the amount of expansion of the distance and presses the support shaft 2. That is, the elastic displacement portion is made so as to elastically displace only in the direction substantially perpendicular to the axial direction of the support shaft 2, so there is no slanting of the optical block 4 in the rolling direction mentioned above. Therefore, slanting of the optical block 4 due to changes in the distance between the reference shaft 1 and the support shaft 2 is prevented.

Further, the positioning rollers 8, 9 and 10, 11 are provided at one side of the optical block 4 in two groups of a pair each. At the other side of the optical block 4, the groups of the pairs of the pressure rollers 12, 13 and 14, 15 are provided at positions corresponding to the axial direction position of the reference shaft 1 where the groups of the positioning rollers are provided. Therefore, the optical block 4 is constructed to be supported at a total of four locations, that is, at the front and rear of the two shafts 1 and 2 in the axial direction at one side and the other, so is prevented from vibrating up and down in direction perpendicular to the direction of travel at the time of travel and displacement of the optical block 4.

Note that the optical block 4 is provided with an attachment surface 4e projecting out from the side surfaces 4f and 4g facing the attachment portion 18c of the center of the roller support member 18 to the optical block 4.

Another example of the roller support member and the pressure rollers will be explained in more detail with reference to FIG. 9 and FIG. 10.

Figure 9:
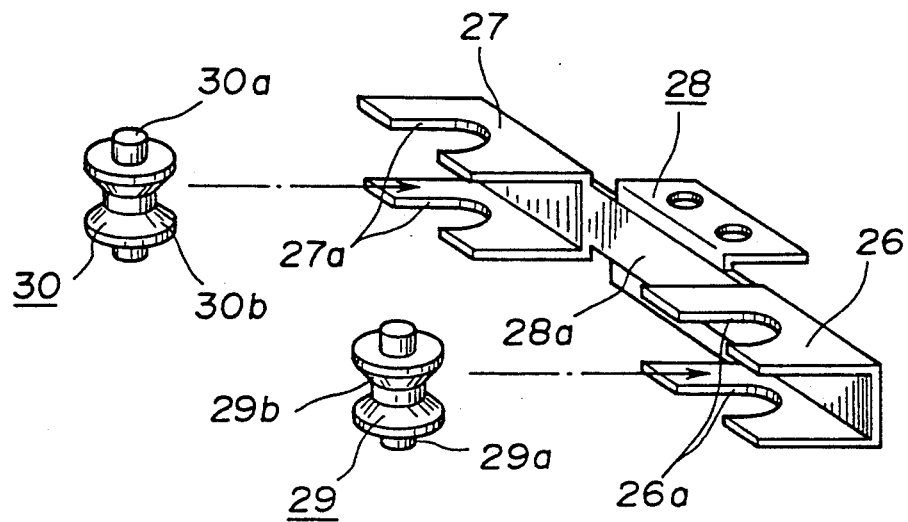
FIG. 9 is a disassembled perspective view showing another example of a roller support member and pressure rollers constituting the present invention.
Figure 10:
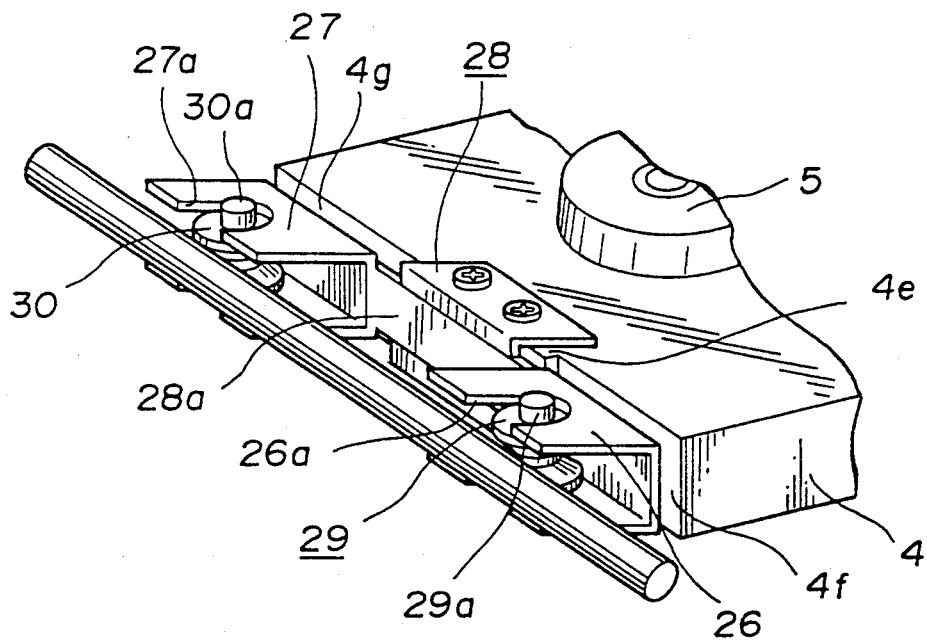
FIG. 10 is a partial perspective view showing another example of a support mechanism for an optical block according to the present invention.

The roller support member 28 illustrated in FIG. 9 and FIG. 10 has at its center a U-section shaped attachment portion 28a to be attached to the attachment surface 4e of the side surface of the optical block 4 and further has at its two wings elastically displaceable roller holding portions 26 and 27 in the same way as the roller support member 18. The roller holding portions 26 and 27 are provided with slits 26a and 27a for engaging with and holding the bearing shafts 29a and 30a of the roller bearings 29 and 30. In the case of this example, the pressure rollers are comprised of just two roller bearings 29 and 30. The peripheral surfaces of the roller bearings 29 and 30 are formed by concave surfaces 29b and 30b which directly abut against the support shaft 2.

The roller bearings 29 and 30 constituting the pressure rollers are made to abut against the support shaft 2 as shown in FIG. 10 in the state where the bearing shafts 29a and 30a are engaged in the slits 26a and 27a and are pressed into the depths of the same, that is, the state where the roller holding portions 26 and 27 are elastically biased toward the side surfaces 4f and 4g side of the optical block, and by the counteraction thereof position the optical block 4 to the reference shaft 1 side.

The example shown in FIG. 9 and FIG. 10 and constituted in this way exhibits the same effects as the support mechanism shown in FIG. 6 and on top of this has the advantage of a greater reduction of the number of parts.

The roller bearings 29 and 30 used here may also be used for supporting the reference shaft 1 side. Of course, at this time, since the bearing shafts are attached to the reference shaft 1 side of the optical block 4, it is necessary to modify the reference shaft 1 side of the optical block 4.

Further, in the present invention, the optical block 4 is desirably supported between the reference shaft 1 and the support shaft 2 so that the center of the optical head 5 is positioned at its center of gravity. By supporting the optical block 4 in this way, it is possible to stably move the optical block 4 in two directions.

What is claimed is:

1. A support mechanism of an optical block in an optical disc drive apparatus provided with a reference shaft, a support shaft positioned substantially parallel to the reference shaft, and an optical block which has an optical head and which is supported between the reference shaft and the support shaft by the support mechanism so that the optical block moves along an axial direction of the reference shaft substantially in parallel with the reference shaft, the support mechanism comprising:
    at least two positioning rotational members provided at a positioning side of the optical block for positioning and guiding the optical block at two positioning locations along the axial direction of the reference shaft,
    at least two supporting rotational members provided at a supporting side of the optical block for supporting and guiding the optical block at two supporting locations along the support shaft, and
    a roller support member including an attachment portion attached to the optical block and wings which elastically support the supporting rotational members so that the supporting rotational members approach and move away from the optical block and so that when any one of the supporting rotational members is moved toward the optical block, the wing supporting that supporting rotational member elastically presses that supporting rotational member away from the optical block.

2. The support mechanism as set forth in claim 1, wherein each positioning rotational member includes a pair of rollers gripping the reference shaft and wherein each supporting rotational member includes a pair of rollers gripping the support shaft.

3. The support mechanism as set forth in claim 1, wherein the positioning rotational members include rollers attached rotatably to shafts and the supporting rotational members include rollers attached rotatably to shafts.

4. A support mechanism of an optical block in an optical disc drive apparatus provided with a reference shaft, a support shaft positioned substantially parallel to the reference shaft, and an optical block which has an optical head and which is supported between the reference shaft and the support shaft by the support mechanism so that the optical block moves along an axial direction of the reference shaft substantially in parallel with the reference shaft; the support mechanism comprising:
    at least two positioning rotational members provided at a positioning side of the optical block for positioning and guiding the optical block at two positioning locations along the axial direction of the reference shaft;
    at least two supporting rotational members provided at a supporting side of the optical block for supporting and guiding the optical block at two supporting locations along the support shaft, each supporting rotational member including a pair of rollers which grip the support shaft;
    a roller support member formed by a plate-like spring material and having elastic displacement portions at two wings of an attachment portion attached to the optical block, the supporting rotational members being attached at roller holders attached to the elastic displacement portions, the wings elastically supporting the supporting rotational members so that the supporting rotational members approach and move away from the optical block and so that when any one of the supporting members is moved toward the optical block, the wing supporting that supporting rotational member elastically presses that supporting rotational member away from the optical block.

5. The support mechanism as set forth in claim 4, wherein spaces for allowing elastic displacement of the elastic displacement portions are present between the elastic displacement portions of the roller support member and a surface of the supporting side of the optical block.

6. The support mechanism as set forth in claim 1, wherein each supporting rotational member includes a pair of rollers gripping the support shaft and is attached to a roller holder attached to elastic displacement portions on the wings of the roller support member so that shafts of the rollers form substantially 45° angles with respect to a plane including an axial center of the reference shaft and an axial center of the support shaft.

7. The support mechanism as set forth in claim 1, wherein the optical block is connected to a movable portion of a linear motor through a connecting arm and is moved and operated along the reference shaft by the linear motor.

8. A support mechanism of an optical block in an optical disc drive apparatus provided with a reference shaft, a support shaft positioned substantially parallel to the reference shaft, and an optical block which has an optical head and which is supported between the reference shaft and the support shaft by the support mechanism so that the optical block moves along an axial direction of the reference shaft substantially in parallel with the reference shaft, the support mechanism comprising:

at least two positioning rotational members provided at a positioning side of the optical block for positioning and guiding the optical block at two positioning locations along the axial direction of the reference shaft;

at least two supporting rotational members provided at a supporting side of the optical block for supporting and guiding the optical block at two supporting locations along the support shaft; and a roller support member provided at a center of the supporting side of the optical block, the roller support member having a U-shaped attachment portion attached to an attachment surface of the supporting side of the optical block and having an elastically displaceable roller holding portion provided at each of two wings of the attachment portion, wherein each supporting rotational member includes a roller bearing having a concave surface formed at a periphery of the roller bearing, the concave surface abutting against the support shaft, each supporting rotational member further including a bearing shaft supporting the roller bearing, the bearing shaft having a top end and a bottom end engaged with and held by slits formed in each roller holding portion of the roller support member, each roller holding portion holding each supporting rotational member, such that when the roller holding portions are elastically biased toward a side surface of the optical block, the roller bearings abut against the support shaft and position the optical block against the reference shaft by an elastic recovery force of the roller holding portions.

9. A support mechanism of an optical block in an optical disc drive apparatus provided with a reference shaft, a support shaft positioned substantially parallel to the reference shaft, and an optical block which has an optical head and which is supported between the reference shaft and the support shaft by the support mechanism so that the optical block moves along an axial direction of the reference shaft substantially in parallel with the reference shaft, the support mechanism comprising:

at least two positioning rotational members provided at a positioning side of the optical block for positioning and guiding the optical block at two positioning locations along the axial direction of the reference shaft;

a roller support member provided on a supporting side of the optical block, the roller support member having an attachment portion attached to an attachment surface of the supporting side of the optical block and having an elastically displaceable roller holding portion provided at each of two wings of the attachment portion, at least two supporting rotational members provided at the supporting side of the optical block for supporting and guiding the optical block at two supporting locations along the support shaft, each supporting rotational member including a roller bearing and a bearing shaft, the roller bearing having a concave surface formed at a periphery of the roller bearing, the concave surface abutting against the support shaft, the bearing shaft supporting the roller bearing and having a top end and a bottom end held by each roller holding portion of the roller support member, whereby when the roller holding portions are elastically biased toward a side surface of the optical block, the roller bearings abut against the support shaft and position the optical block against the reference shaft by an elastic recovery force of the roller holding portions.

* * * * *